United States Patent [19]
Smyth, Jr.

[11] Patent Number: 5,481,083
[45] Date of Patent: Jan. 2, 1996

[54] SYSTEM AND METHOD FOR STACKING AND LASER CUTTING MULTIPLE LAYERS OF FLEXIBLE MATERIAL

[75] Inventor: Dale C. Smyth, Jr., Lawrenceberg, Ind.

[73] Assignee: Cincinnati, Incorporated, Cincinnati, Ohio

[21] Appl. No.: 172,439

[22] Filed: Dec. 23, 1993

[51] Int. Cl.⁶ .................................................. B23K 26/14
[52] U.S. Cl. ............................. 219/121.67; 219/121.78; 219/121.82
[58] Field of Search ........................... 219/121.6, 121.67, 219/121.68, 121.69, 121.7, 121.71, 121.72, 121.78, 121.79, 121.8, 121.82

[56]  References Cited

U.S. PATENT DOCUMENTS

| | | | |
|---|---|---|---|
| 3,761,675 | 9/1973 | Mason et al. | 219/121.67 |
| 3,764,775 | 10/1973 | Hasslinger et al. | 219/121.67 |
| 3,769,488 | 10/1973 | Hasslinger | 219/121.72 |
| 3,784,183 | 1/1974 | Castro et al. | 269/20 |
| 3,811,554 | 5/1974 | Egan | 112/89.23 |
| 3,828,159 | 8/1974 | Zoot | 219/121.72 |
| 3,828,697 | 8/1974 | Eagan | 105/81 |
| 3,889,095 | 6/1975 | Eagan | 219/121.82 |
| 3,931,491 | 1/1976 | Stumpf | 219/121.67 |
| 4,434,691 | 3/1984 | LeBlend | 83/56 |
| 4,588,871 | 5/1986 | Etcheparre et al. | 219/121.82 |
| 4,680,442 | 7/1987 | Bauer et al. | 219/121.67 |
| 4,752,352 | 6/1988 | Feygin | 156/630 |
| 4,760,237 | 7/1988 | Mizukado et al. | 219/121.82 |
| 5,049,723 | 9/1991 | Macdonald | 219/121.67 |
| 5,182,434 | 1/1993 | Nakata | 219/121.72 |
| 5,192,848 | 3/1993 | Miyakawa et al. | 219/121.82 |
| 5,359,175 | 10/1994 | Miyakawa et al. | 219/121.82 |

OTHER PUBLICATIONS

Hauser Elektronik GmbH, Automatic Length/Cross Cutting and Stacking Machine, Type QLA, Brochure, pp. 1–12.

*Primary Examiner*—Tu Hoang
*Attorney, Agent, or Firm*—Frost & Jacobs

[57]  ABSTRACT

A stacking and laser cutting system and method, for cutting multiple layers of flexible material, comprising a CNC laser center and a cutting and stacking machine. The laser center includes a cutting zone, a loading and unloading zone, a laser cutting head assembly shiftable anywhere within the cutting zone, upper and lower pallet bearing carriages shiftable between the cutting zone and the loading and unloading zone, and and elevating mechanism to lift the lower carriage pallet in the loading and unloading zone to the same vertical loading level that the upper carriage pallet occupies in the loading and unloading zone. The cutting and stacking machine includes a material supply section and a cutting and stacking section. The cutting and stacking section is mounted on the laser center over the loading and unloading zone. The material supply section provides one or more webs which the cutting and stacking section draws over the pallet of that one of the upper and lower carriages located within the loading, and unloading zone. The web or webs are cut forming one or more material plies on the pallet. This procedure is repeated until a desired stack of material plies is located on the pallet. The loaded carriage and pallet is shifted to the cutting zone for the plies to be cut and the other carriage and pallet is shifted to the loading and unloading zone where previously cut material parts are removed therefrom and another stack of plies is loaded thereon for subsequent shifting to the cutting zone.

27 Claims, 6 Drawing Sheets

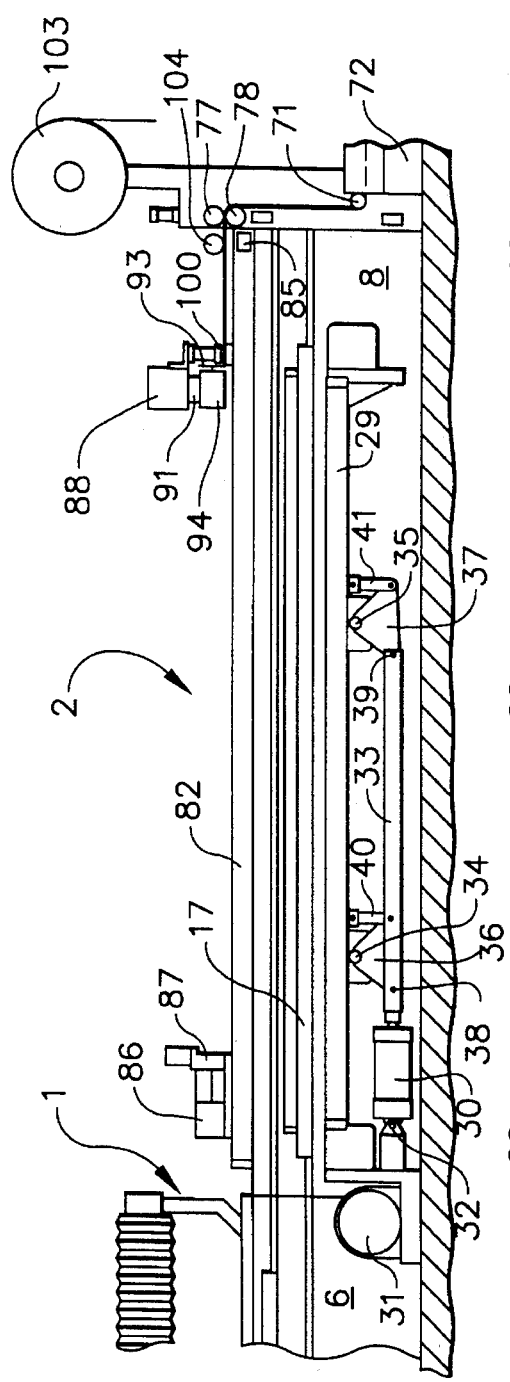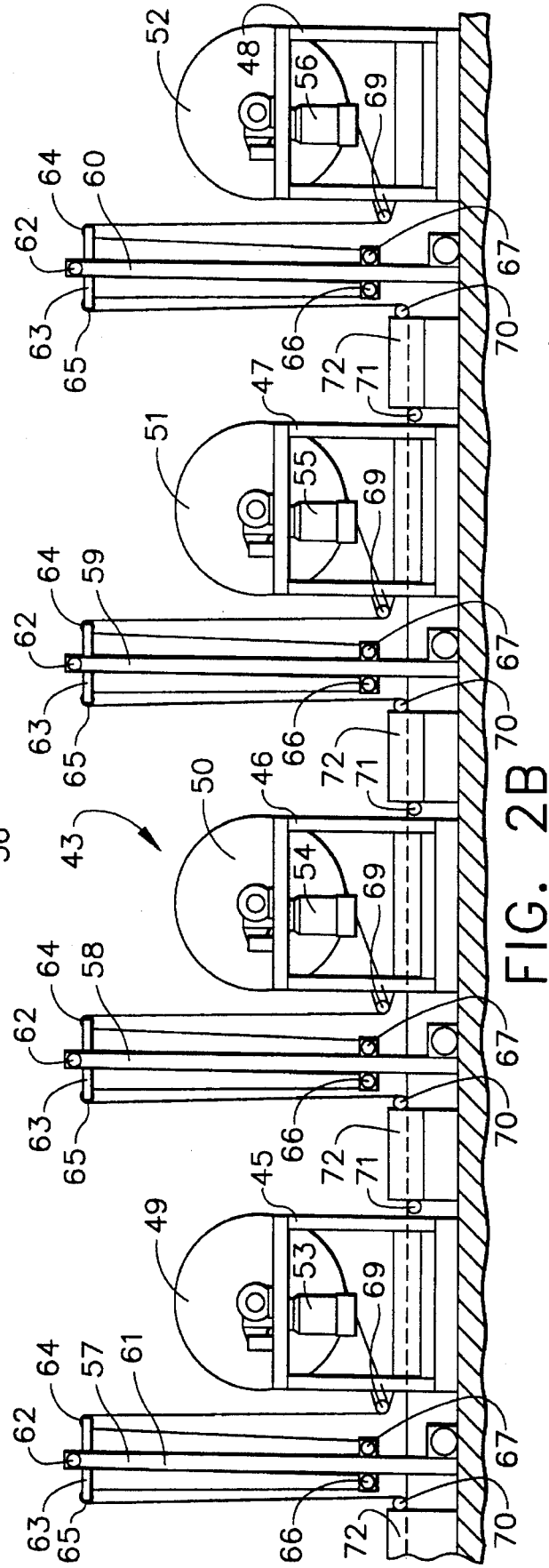

FIG. 3

SYSTEM AND METHOD FOR STACKING AND LASER CUTTING MULTIPLE LAYERS OF FLEXIBLE MATERIAL

TECHNICAL FIELD

The invention relates to the laser cutting of a stack of flexible material plies, and more particularly to an apparatus and a method whereby material in the form of one or more webs is automatically cut and deposited on a pallet of a laser center, forming a stack of plies thereon, for transfer to the laser center cutting zone.

BACKGROUND ART

Heretofore, flexible material such as fabric, plastic material, and the like has been spread on an elongated lay-up table by a conventional spreader which travels back and forth along the length of the table. Once the desired number of plies has been deposited on the table by the spreader, patterns are cut from the plies by hand operated cutting devices.

More recently, there has been great interest in utilizing a laser to cut patterns from flexible material. For the most part, the devices and methods developed by prior art workers were intended to utilize a laser to cut a single layer of fabric or the like. U.S. Pat. No. 3,761,675, for example, teaches such a system. The reference system utilizes a conventional cloth spreader held in a fixed position to deposit fabric upon a moving conveyor belt-type support at a rate compatible with the movement of the support. U.S. Pat. No. 3,764,775 teaches the use of a laser cutter and means to advance fabric thereto in intermittent fashion. The reference system utilizes a continuous conveyor or one or more carriages.

U.S. Pat. Nos. 3,811,554; 3,828,697 and 3,889,095 teach a laser cutting system for fabric whereby a single fabric ply is paid off a roll at a rate consistent with the movement of the support for the fabric. The support may constitute a segmented conveyor belt of honeycomb slats, or a slidable tray comprising a honeycomb structure supported on knife edge slats. U.S. Pat. No. 3,828,159 teaches a table surface for use in the laser cutting of cloth. The supporting table surface comprises a honeycomb structure backed by a heat absorbing and non-reflecting material.

U.S. Pat. No. 4,680,442 teaches an apparatus for cutting multiple layers of fabric. In this instance, multiple layers of fabric are disposed upon a honeycomb support. The honeycomb support, in turn, is mounted on a vacuum table connected to a vacuum source whereby smoke and debris from the multiple layers of fabric can be withdrawn and disposed of.

In most instances, prior art systems for cutting multiple layers of flexible material such as fabric have involved the use of a conventional spreader, or have been laid up by hand. Both operations are relatively slow.

In prior art continuous systems, utilizing a continuous support surface, it has been possible to provide a number of plies, but there must be a roll for each ply which is sometimes difficult to manage and which generally requires considerable floor space.

The present invention is based upon the discovery that if a conventional CNC (computerized numerical control) laser center, of the type having a cutting zone, a loading/unloading zone, and upper and lower carriages, each bearing a support pallet and each capable of being shifted between the cutting zone and the loading/unloading zone, is combined with a cutting and stacking machine of the type having a cutting and stacking section and a material supply section capable of handling one or more rolls of material, a simpler, faster and more efficient system may be achieved. Stacks of flexible material can be formed on each of the carriage pallets having a number of layers dependent upon the nature of the material, its thickness and the like. The plies of each stack may be of several different materials which can be stacked in a desired order, as will be set forth hereinafter. A flexible cover sheet is applied to each stack to assist in movement of the laser center cutting head assembly thereover. No vacuum is required to hold the plies in place and sufficient pressure may be applied on the stack by the laser cutting head assembly to reduce the stack thickness up to about 50% to keep the laser beam from being reflected between the plies. This compression of the stack occurs only at the vicinity of the laser beam.

DISCLOSURE OF THE INVENTION

According to the invention there is provided a system for stacking and laser cutting multiple layers of flexible material. The system comprises a CNC laser center and a cutting and stacking machine. The laser center is of the type having a cutting zone, a loading/unloading zone, a laser cutting head assembly shiftable anywhere within the cutting zone, upper and lower pallet bearing carriages shiftable between the cutting zone and the loading/unloading zone, and means to elevate the lower carriage pallet in the loading/unloading zone to the same vertical loading level as the upper carriage pallet occupies when in the loading/unloading zone. The cutting and stacking machine is of the type comprising a material supply section and a cutting and stacking section. The material supply section comprises one or more stands for supporting one or more rolls of flexible material, an accumulator for each stand and means for collecting and directing the one or more webs from the one or more material rolls to the cutting and stacking section. The cutting and stacking section of the cutting and stacking machine is mounted on the laser center over the loading/unloading zone. In the cutting and stacking section, the one or more webs are drawn over the pallet of that one of the upper and lower carriages located within the loading/unloading zone. The web or webs are cut, forming one or more material plies on the pallet. This procedure is repeated until a desired stack of material plies is located on the pallet. The loaded carriage and pallet are shifted to the cutting zone where patterns are cut from the plies, and the other carriage and its pallet are shifted to the loading/unloading zone where previously cut material parts are removed therefrom and another stack of plies is loaded thereon for subsequent shifting to the cutting zone.

The number of plies constituting a stack will depend upon clearance between the upper and lower carriage pallets, the nature of the material to be cut, and the like. The material supply section of the cutting and stacking machine may supply more than one type of flexible material which may be arranged in the stacks in one of several different predetermined orders.

The cutting and stacking machine is additionally provided with a roll of cover sheet material applied as the uppermost ply of each stack to assist in movement of the laser cutting head assembly across the stack without wrinkling or shifting the plies thereof. The laser cutting head assembly is so supported that it supplies sufficient pressure to the stack adjacent the cutting beam to reduce the thickness of the stack up to about 50% at the position of the cutting beam.

BRIEF DESCRIPTION OF THE DRAWINGS

FIG. 2A is a simplified elevational view, similar to FIG. 2, with the near sides of the load frame and main frame removed and with the spreading and cutting section of the cutting and stacking machine of the system of the present invention shown mounted on the laser center loading/unloading zone.

FIG. 2B is a simplified, fragmentary, continuation of the right end of FIG. 2A, illustrating the material supply section of the cutting and stacking machine of the system of the present invention.

FIG. 3 is a simplified perspective view of the spreading and cutting section of the cutting and stacking machine of the system of the present invention.

DETAILED DESCRIPTION OF THE INVENTION

Throughout the Figures, like parts have been given like index numerals. The system for stacking and cutting multiple layers of flexible material, as described herein, is made up of two primary components. The first component is a CNC laser center, best shown in FIG. 1, 2 and 2A, and generally indicated at 1. The second component is a cutting and stacking machine, best shown in FIGS. 2A, 2B and 3, and generally indicated at 2. Each of the primary components 1 and 2 and their combination and interaction will next be described.

Figure 1:
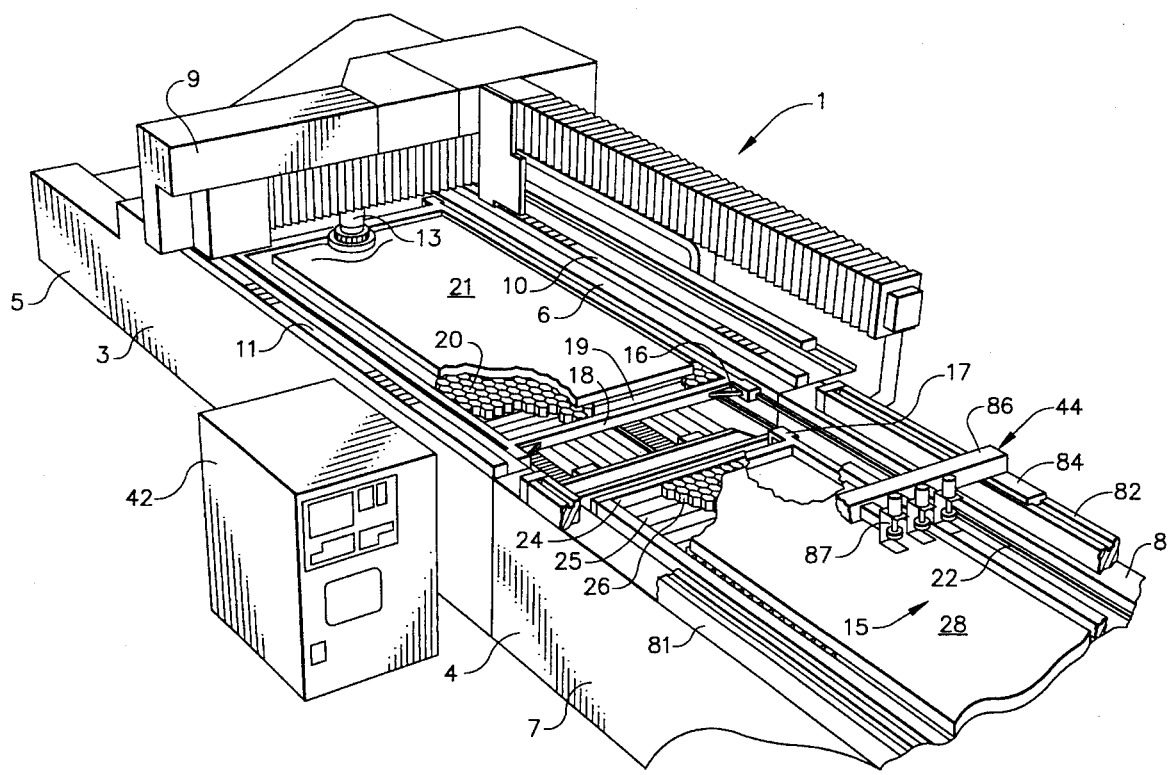
FIG. 1 is a simplified, fragmentary, perspective view of the laser center of the system of the present invention illustrating the loading/unloading zone and the cutting zone thereof.
Figure 2:
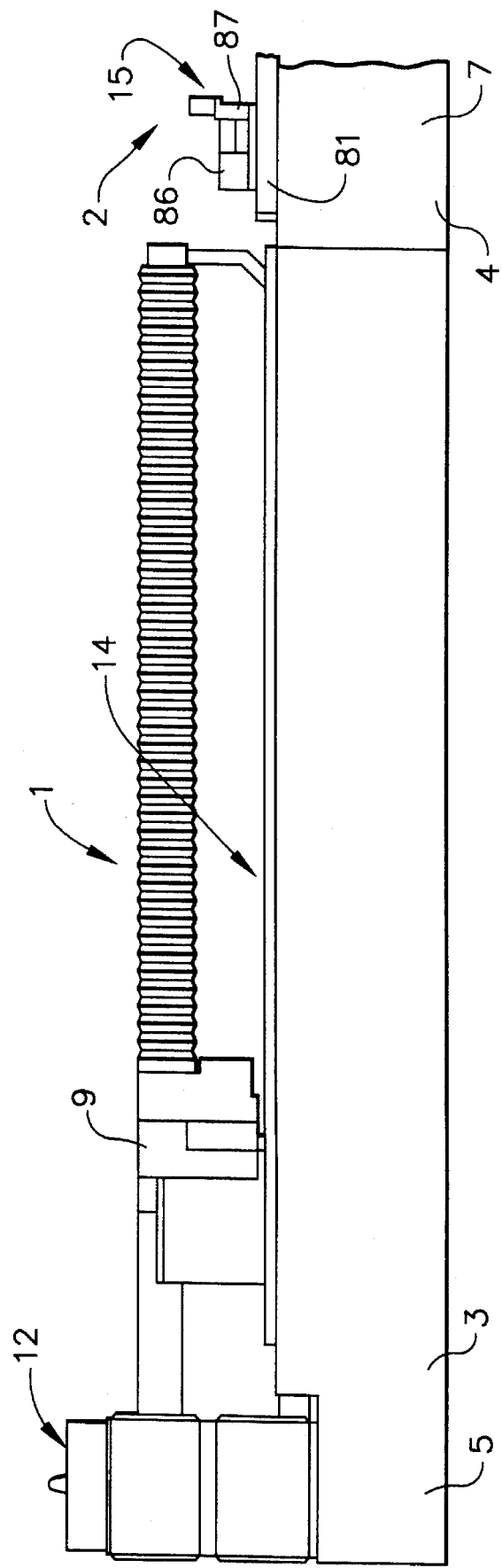
FIG. 2 is a simplified, side elevational view of the structure of FIG. 1.

Reference is first made to FIGS. 1 and 2 wherein the CNC laser center 1 is shown. An exemplary CNC laser center, suitable for the system of the present invention, is manufactured by Cincinnati Incorporated, of Cincinnati, Ohio, under the designation CL-7 CNC LASER CENTER. The laser center 1 comprises a main frame 3 and a load frame 4, constituting an extension of main frame 3. Main frame 3 includes a pair of longitudinal sides 5 and 6, arranged in parallel spaced relationship. Load frame 4 includes a pair of longitudinal sides 7 and 8 in parallel spaced relationship, and constituting extensions of main frame sides 5 and 6, respectively.

Extending transversely of main frame 3 there is a gantry 9 which is capable of being shifted longitudinally of main frame 3 on gantry rails 10 and 11. The laser resonator and the laser control are mounted behind gantry 9 and are generally indicated at 12 in FIG. 2. The laser resonator and laser control 12 are not shown in FIG. 1.

Figure 4:
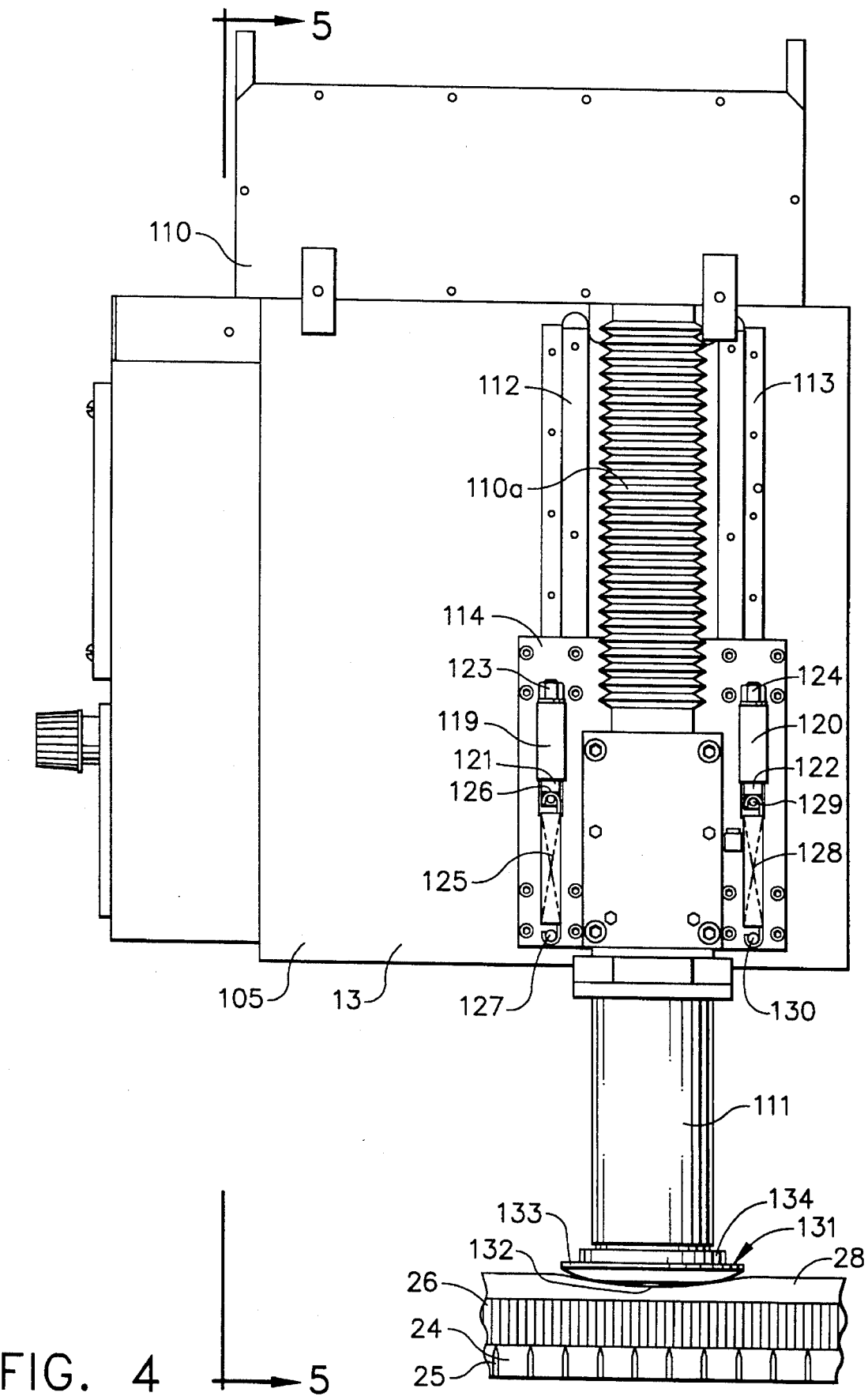
FIG. 4 is a fragmentary elevational view of the laser cutting head assembly of the present invention.
Figure 5:
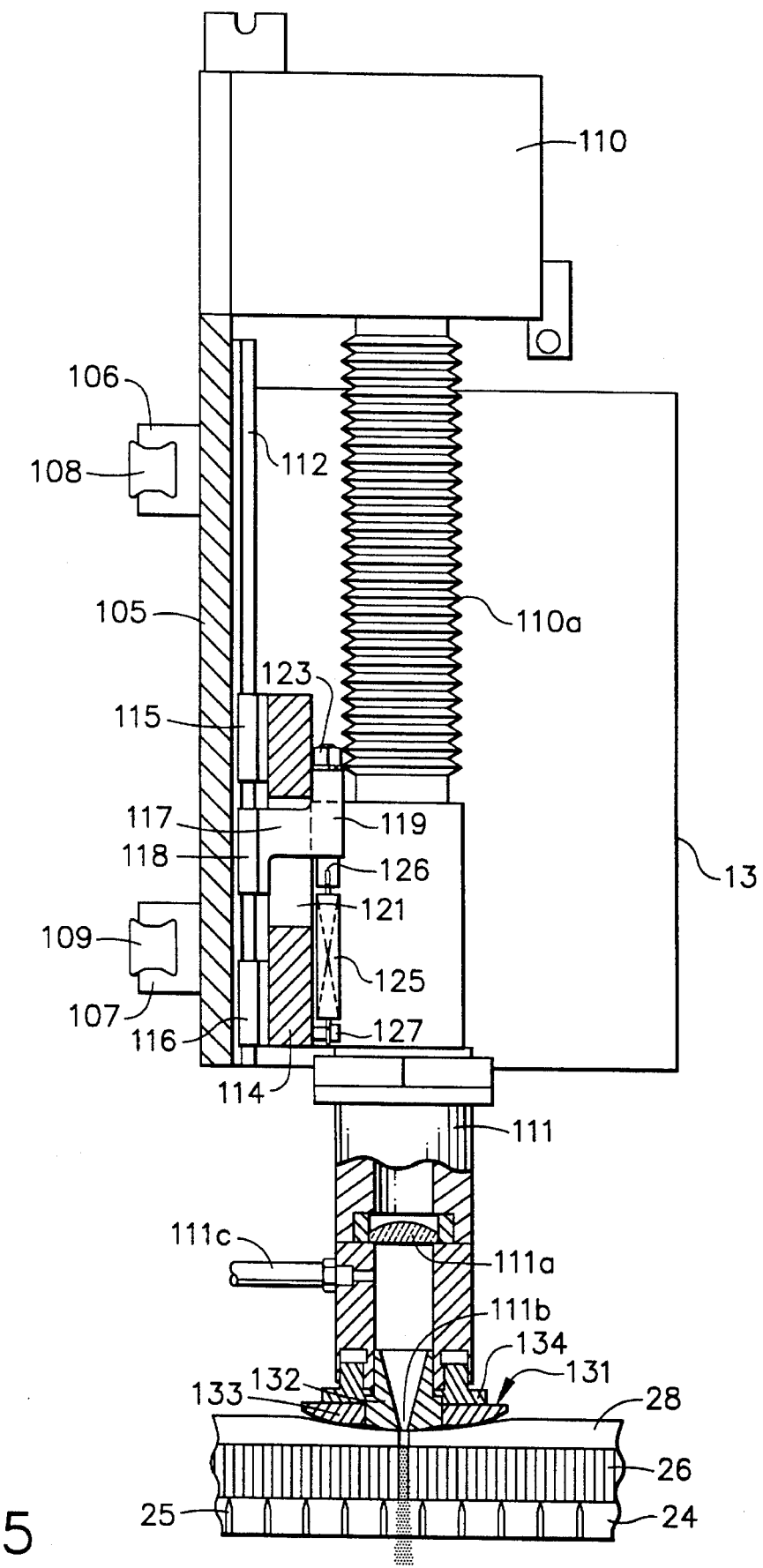
FIG. 5 is a cross-sectional view taken along section line 5—5 of FIG. 4.

The gantry 9 supports a laser cutting head assembly 13. The laser cutting head assembly 13 is also shown in FIGS. 4 and 5, and will be more fully described hereinafter. As is well known in the art, mechanism is provided in association with gantry 9 to enable the shifting of laser cutting head assembly 13 therealong. Longitudinal movement of gantry 9 along gantry rails 10 and 11 will cause longitudinal movement of laser cutting head assembly 13 with respect to main frame 3. Shifting of laser cutting head assembly 13 along the gantry 9 enables transverse shifting of the laser cutting head assembly 13 with respect to the main frame 3. The main frame 3 provides a cutting zone, generally indicated at 14. Movement of the laser cutting head assembly 13 with respect to gantry 9, and movement of gantry 9, enable the laser cutting head assembly 13 to be moved anywhere within the cutting zone 14. The load frame 4 defines a spreading or loading/unloading zone, generally indicated at 15 and located adjacent cutting zone 14.

The CNC laser center 1 is provided with an upper carriage 16 and a lower carriage 17. Each of the upper and lower carriages 16 and 17 are shiftable between cutting zone 14 and loading/unloading zone 15.

Upper carriage 16 comprises a rectangular carriage frame 18. Within the carriage frame 18, and below its upper surface, there is a plurality of parallel spaced transversely extending support slats 19 affixed to frame 18. Support slats 19 are made of metal and have their uppermost longitudinal edges provided with a pointed or knife edge configuration, to minimize damage to the carriage slats 19 by the laser beam during a cutting operation. Replaceably mounted on the support slats 19 of the upper carriage frame 18 is an aluminum pallet 20 of honey comb configuration. The honey comb pallet 20 supports the stack 21 of material to be cut.

The upper carriage 16 is shiftable between cutting zone 14 and loading/unloading zone 15 by virtue of the fact that the carriage 16 is mounted on a pair of rails, one of which is shown at 22 in FIG. 1. The rail 22 is mounted on the inside surface of main frame wall 6 and load frame wall 8. In a similar fashion, the second rail (not shown) of the pair of rails supporting carriage 16 is mounted on the inside surfaces of main frame wall 3 and load frame wall 7 in a manner identical to that shown with respect to rail 22.

Lower carriage 17 comprises a frame 23 similar to upper carriage frame 16. In this instance, however, frame 23 of lower carriage 17 is not provided with a plurality of transversely extending metallic slats similar to slats 19 of upper carriage frame 18. Instead, the lower carriage frame 23 is provided with triangular gussets (not shown) located at its corners. The triangular gussets support a pallet frame 24 which comprises a rectangular frame having a plurality of transversely extending metallic support slats 25, substantially identical to support slats 19 of upper carriage 16. The support slats 25 are clearly shown in FIGS. 4 and 5. It will be noted that their upper longitudinal edges are pointed, as described with respect to support slats 19, and for the same reason. Pallet frame 24 and its support slats 25, in turn, support an aluminum pallet 26 of honey comb configuration, similar to aluminum pallet 20 of upper carriage 16. The reason for providing a pallet frame 24 within lower carriage frame 23 will be set forth hereinafter. As is true of the upper carriage 16, the lower carriage 17 is supported on a pair of rails, one of which is illustrated at 27. Rail 27 is affixed to the inside surfaces of main frame wall 6 and load frame wall 8 in the same manner described with respect to upper carriage rail 22, with the exception that lower carriage rail 27 is located parallel to and below upper carriage rail 22. In a similar fashion, the other rail of the pair supporting lower carriage 17 is affixed to the inside surfaces of main frame wall 5 and load frame wall 7 below the rail mounted on the same inside surfaces for support of upper carriage 16. The vertical spacing between lower carriage 17 and upper carriage 16 must be such that when the lower carriage 17 is provided with a maximum stack of plies of material to be cut by laser cutting head assembly 13, it will pass with clearance beneath upper carriage 16. In FIG. 1, an exemplary load of material plies to be cut on lower carriage pallet 26 is indicated at 28.

To insure proper loading of the stack 28 of material to be cut onto honey comb pallet 26 of lower carriage 17, it is desirable to locate honey comb pallet 26 at the same vertical level in loading/unloading zone 15 as would be occupied by honey comb pallet 20 of upper carriage 16, when in loading/unloading zone 15. As a result of this, the plies of stack 28 will fall the same predetermined distance onto pallet 26 during the loading procedure, as do the plies of stack 21 when loaded on pallet 20 of upper carriage 16. The maximum distance required of the layers of either stack 21 or 28 is predetermined such that the stacks will not be affected by rippling or floating of the plies as they fall onto their respective pallet 20 or 26, as will be further discussed hereinafter.

To assure that the loading level of pallet 26 is substantially identical to the loading level of pallet 20, means are provided to lift the pallet frame 24 and honey comb pallet 26 of lower carriage 17 and to support these elements in elevated position in the loading/unloading zone 15. Lower carriages, similar in construction to that described with respect to lower carriage 17, have been used heretofore in conjunction with a lifting mechanism to locate the lower carriage pallet, while in the loading/unloading zone, at the same level as is normally occupied in the loading/unloading zone by the upper carriage pallet. Heretofore this has been done to facilitate unloading of the pallet of the lower carriage. In such an instance, a pair of substantially identical lifting mechanisms is provided, the lifting mechanisms being located beneath pallet frame 24 and near its longitudinal side portions. Such lifting mechanisms can be used for the purpose of this invention as well. Since the two lift mechanisms are substantially identical, the one visible in FIG. 2A will be described, and that description will stand as a description of the second lifting mechanism, not shown. The two lift mechanisms operate a lift frame 29 which is so sized that, when elevated, it will pass through the lower carriage frame 23 and will engage and lift pallet frame 24 and its honey comb pallet 26. The first lift mechanism comprises an air cylinder 30 operatively attached to a supply 31 of compressed air. The air cylinder 30 has a piston rod 32 affixed to a push bar 33.

A pair of pivot shafts 34 and 35 extend transversely of loading/unloading zone 15 and are mounted in suitable bearings (not shown) on the inside surfaces of the load frame side walls 7 and 8. The first corners of two bell cranks 36 and 37 are non-rotatively affixed to rotatable pivot shafts 34 and 35, respectively. A second corner of each bell crank 36 and 37 is pivotally affixed to push bar 33, as at 38 and 39. The third corner of each bell crank 36 and 37 is pivotally attached to lift links 40 and 41, respectively. The lift links 40 and 41, in turn, are pivotally affixed to lift frame 29. It will be understood that the second lifting mechanism will similarly comprise an air cylinder operatively attached to the pressurized air source 31 and operatively connected to a push bar. The second lifting mechanism will have bell cranks non-rotatively affixed to pivot shafts 34 and 35. The bell cranks of the second lifting mechanism will also be pivoted to their respective push bar and to a pair of lift links similar to lift links 40 and 41.

From the above description, it will be obvious to one of ordinary skill in the art that as the lower carriage 17 is shifted to the loading/unloading zone 15, it will achieve a position overlying lift frame 29. Control means will cause the cylinder 30 to shift push bar 33 to the right as viewed in FIG. 2A. This in turn will cause rotation of bell cranks 36 and 37 about pivot shafts 34 and 35. As a result, lift links 40 and 41 will be moved upwardly, causing the lift frame 29 to pass through the lower carriage frame 23, engaging and lifting pallet frame 24 until honey comb pallet 26 is brought to the desired vertical level. The other lift mechanism acts simultaneously in precisely the same way. When the piston rods of air cylinder 30 and its counterpart are retracted, the lift frame will be lowered to its normal position shown in FIG. 2A, causing the pallet frame 24 to be lowered into and into engagement with the frame 23 of lower carriage 17.

The operation of the CNC laser center is, for the most part, preprogrammed and automatic. To this end, the CNC laser center is provided with an operator console 42 (See FIG. 1).

The first component of the system of the present invention, the CNC laser center 1, having been described, the second component of the system, the cutting and stacking machine 2, will now be discussed in detail primarily in conjunction with FIGS. 2A, 2B and 3.

A suitable cutting and stacking machine for use the present invention is manufactured by Hauser Elektronik GMBH of Offenburg, Germany, under the designation AUTOMATIC LENGTH/CROSS CUTTING AND STACKING MACHINE, TYPE QLA 2000. The cutting and stacking machine 2, like the CNC laser cutter 1, has two sections: a material supply section generally indicated at 43 and illustrated in simplified fashion in FIG. 2B, and a spreading and cutting section generally indicated at 44, and illustrated in FIGS. 2A and 3.

The material supply section 43 comprises a plurality of roll stands, four of which are shown in FIG. 2B at 45, 46, 47 and 48, respectively. The roll stands 45–48 support material rolls 49, 50, 51 and 52, respectively. Each of the material rolls 49–52 are driven by roll drives 53, 54, 55 and 56, mounted on their respective roll stands 45–48.

Each of the roll stands 45–48 are provided respectively with an accumulator. The accumulators are indicated in FIG. 2B at 57, 58, 59 and 60. A description of accumulator 56 associated with roll stand 45 can also serve as a description of accumulators 58, 59 and 60. With respect to all of accumulators 57–60, like parts have been given like index numerals.

The accumulator 57 comprises a vertical support assembly or frame 61 which, at its upper end, supports an idler roll 62. The vertical support frame 61 has a horizontal support frame 63 mounted near its upper end and carrying an additional pair of idler rolls 64 and 65. Vertical support frame 61 also carries a rack 66 which, in turn, supports a pair of slack or dancer rolls 67 and 68. The rack 66 and its slack rolls 67 and 68 are shiftable vertically within the vertical support frame 61. It will be apparent from FIG. 2B that the web from material roll 49 passes about a directional roll 69 mounted on roll stand 45 and enabling the web to shift upwardly to upper idler roll 64. From upper idler roll 64 the web passes downwardly and about slack roll 67. Thereafter it extends upwardly and about upper idler roll 62. From upper idler roll 62, the web passes downwardly to the second slack roll 68 and upwardly to the third upper idler roll 65. From upper idler roll 65 the web passes about idler roll 70 and idler roll 71 (shown in FIG. 2A). Idler rolls 70 and 71 are mounted on a support and walkway structure 72. Idler rolls 70 and 71 cause the web to move horizontally along the material supply section 43. It will be noted that all of the roll stands 45–48 and their respective accumulators 57–60 are followed by a roll support and walkway structure 72 having idler rolls 70 and 71 thereon. It will further be noted that the purpose of idler rolls 70 and idler roll 71 throughout the material supply section 43 is to shift the webs horizontally along the material supply section. The roll 70 adjacent accumulator 60 introduces the web from material roll 52 into this horizontal web stream. The roll 70 adjacent accumulator 59 introduces the web from material roll 51 into the horizontal stream. The web from roll 50 is introduced into the horizontal stream by that roll 70 adjacent accumulator 58. Finally, the web from material roll 49 is introduced into the horizontal web flow at the idler roll 70 adjacent accumulator 57. At this last mentioned idler roll, the horizontal flow of webs comprises a total of four plies or webs, one from each of the rolls 49–52. In all of the roll support and walkway structures 72, except that roll support and walkway structure 72 adjacent accumulator 57, idler roll 71 lies beneath the web or webs. As is shown in FIG. 2A, the idler roll 71 of roll support and walkway structure 72 adjacent accumulator 57 lies above the webs, turning the webs upwardly toward the spreading and cutting section 44, next to be described. The dancer rolls 67 and 68 of the accumulators 57–60 accommodate acceleration and deceleration of material rolls 49–52. The accumulators contain enough material from rolls 49–52 for one operation of the spreading and cutting section 44 of cutting and stacking machine 2.

Figure 3:
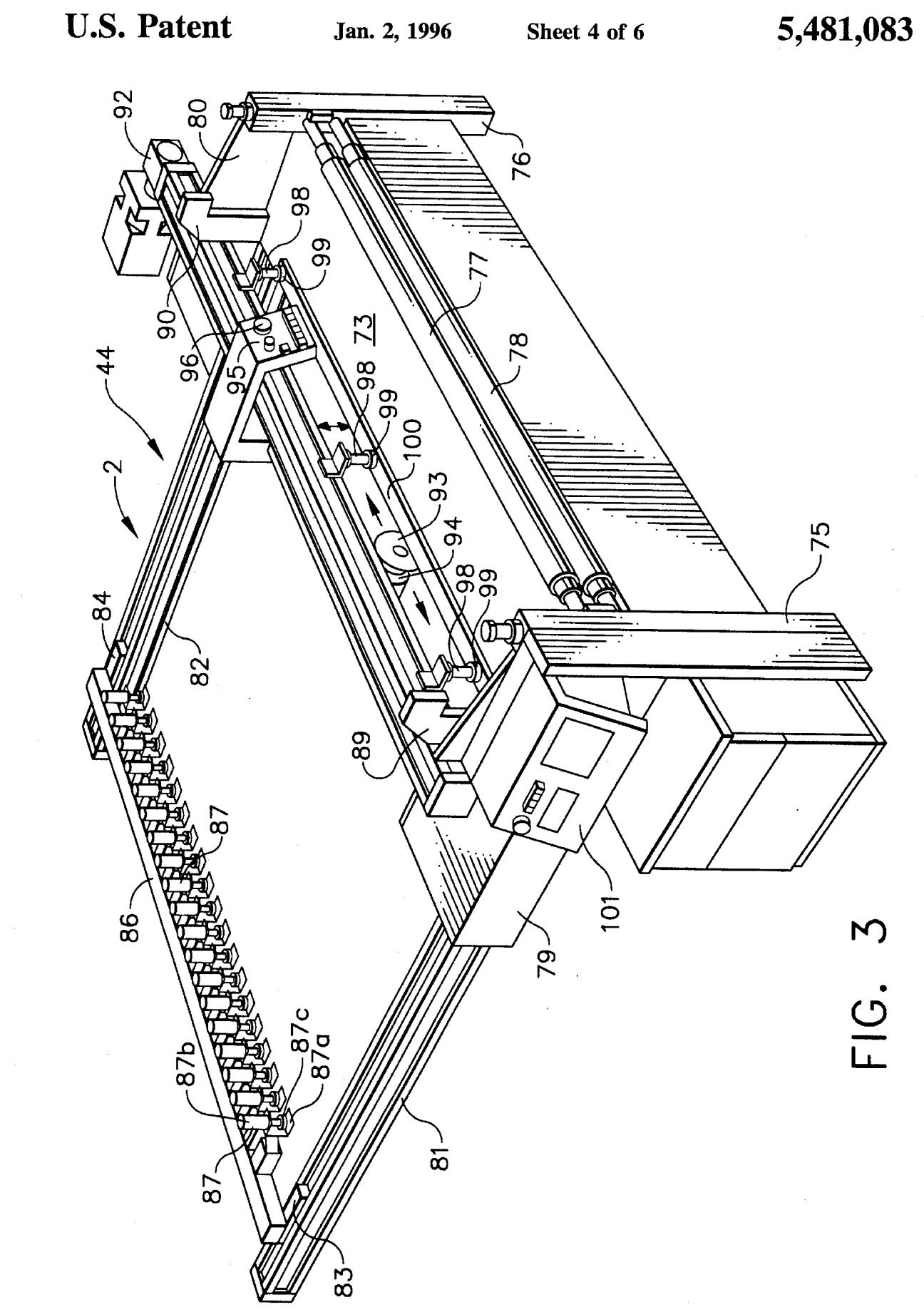

The spreading and cutting section 44 of cutting and stacking machine 2 is best shown in FIGS. 2A and 3. Turning first to FIG. 3, the spreading and cutting section 44 comprises a horizontal table 73 having a downwardly depending panel 74 along that longitudinal edge of table 73 which faces the material supply section 43. The table is provided with a pair of uprights 75 and 76. The uprights support a pair of nip rolls 77 and 78. Nip rolls 77 and 78 constitute feed rolls, and they feed the webs from the adjacent idler roll 71 of the material supply section 43 into the spreading and cutting section 44. The feed rolls 77 and 78 are driven by appropriate prime mover means not shown. The table 73 is completed by a pair of protective side members 79 and 80.

Extending forwardly of table 73 there is a pair of gripper bar guideways 81 and 82. As is best shown in FIG. 2A, the uprights 75 and 76 of the spreading and cutting section 44 are located at the free end of the loading/unloading zone 15 of CNC laser center 1. The gripper bar guideway 82 is mounted on the upper surface of the loading zone sidewall 8 of load frame 4 and is supported thereby. In a similar fashion, the gripper bar guideway 81 is affixed to and supported by the upper surface of sidewall 7 of load frame 4 of the loading/unloading zone 15. This is shown in FIG. 1.

Returning to FIG. 3, the gripper bar guideways 81 and 82 have mounted for movement therein gripper bar carriages 83 and 84, respectively. The gripper bar carriage 84 is shiftable back and forth along its gripper bar guideway 82 by a belt means (not shown) located within the gripper bar guideway 82 and attached to the gripper bar carriage 84. The belt, in turn, is driven by a motor and gear box, shown in FIG. 2A at 85. It will be understood that the gripper bar carriage 83 is similarly shiftable back and forth along its gripper bar guideway 81 by belt means (not shown) located therewithin and driven by a motor and gear box (not shown). Carriages 83 and 84 support the ends of a gripper bar 86. The gripper bar 86, in turn, supports a plurality of grippers 87. Each gripper 87 comprises a gripper surface 87a, and air cylinder 87b and a piston 87c. When the gripper cylinder 87b is actuated, the material plies are gripped between gripper surface 87a and piston 87c, as will be further described hereinafter. It will be apparent from the above description that the grippers 87 extend transversely across loading/unloading zone 15 (see FIG. 1), and are shiftable longitudinally of loading/unloading zone 15 toward and away from table 73 by driven carriages 83 and 84.

Extending transversely of loading/unloading zone 15, adjacent that edge of table 73 facing the loading/unloading zone 15 there is a cutter guideway 88, mounted on supports 89 and 90 so as to be spaced upwardly from the top surface of table 73. A carriage is located within cutter guideway 88 and has a portion 91 extending below cutter guideway 88. The carriage 91 supports a cutter 92. The carriage 91 is shiftable along cutter guideway 88 by a belt (not shown) located within cutter guideway 88 and driven by a motor and gear box assembly 92.

The cutter may take any appropriate form. For purposes of an exemplary showing, the cutter is illustrated as a disk cutter 93. Disk cutter 93 may be provided with its own motor 94, or it may be non-motorized. Controls for cutter 93 may be provided at 95, including an emergency stop button 96. As is clear from FIG. 2A, the disk cutter 93 is adapted to traverse the loading/unloading zone 15 along a path of travel parallel to and adjacent that edge of table 73 which faces the loading/unloading zone 15. Thus, when a series of webs or plies are drawn across loading/unloading zone 15 by grippers 87, once the webs or plies are in place over loading/unloading zone 15, the webs or plies are cut by cutter 93 and released by grippers 87 so as to fall upon whichever one of pallets 20 and 26 is in place thereunder.

The cutter guideway 88 has affixed thereto a series of angle brackets 97. Angle brackets 97 support air cylinders 98, the pistons 99 of which are affixed to a clamping bar 100. Clamping bar 100 is actuated by air cylinders 98 to clamp the webs of material against the upper surface of table 73 during a web severing or cutting operation. The cutting and stacking machine 2 is completed by the provision of an operator's console 101 having appropriate computerized controls for the material supply section 43 and the spreading and cutting section 44 of cutting and stacking machine 2.

Located between the material supply section 43 and the spreading and cutting section 44 of cutting and stacking machine 2 there is a vertical support, a portion of which is shown at 102 in FIG. 2A. The vertical support carries a roll 103 of cover material, the purpose of which will be described hereinafter. An idler roll 104 (see FIG. 2A) is provided for the cover material 103 and is appropriately mounted at its ends above table 73. Idler roll 104, for example, could be mounted in bearings (not shown) affixed to the safety sidewalls 79 and 80 of the cutting and stacking machine 2.

The mechanism of the present invention having been described, the method of operation of the mechanism may now be set forth.

The method and system of the present invention has many applications such as the cutting of fabric for apparel, the cutting of material for filter bags, the cutting of material to manufacture garbage bags or the like, etc. For purposes of an exemplary showing, the system and method are described in their application to the cutting of nylon parts for the manufacture of automotive air bags.

In the cutting of nylon plies, it has been found that when a laser is used, the laser beam tends to weld the cut parts together during a cutting operation. To prevent this, an interleaving or separator layer is located between each of the nylon plies. Various types of separator layers can be used. Successful operations have been achieved utilizing 30 pound kraft paper separator layers. The separator layers may also be made of wax coated paper, or polyethylene coated paper.

For purposes of an exemplary showing, the present invention will be described with respect to the use of polyethylene film material as an interleaving or separator ply. The polyethylene separator should have a sufficient thickness to be capable of acting as a separator. A thickness of at least two mils should be used. The polyethylene interleaving material is easy to handle and is recyclable.

Where the air bag is to be assembled of single ply nylon parts (i.e. front panel, rear panel, side panels, inflator panels and the like), roll 49 of the material supply section 43 would be a roll of nylon material; roll 50 would be a roll of polyethylene material; roll 41 would be a roll of nylon material; and roll 52 would be a roll of polyethylene material. As a consequence, when the plies or webs reach feed rolls 77 and 78, they comprise, in sequence from top to bottom, a nylon web, a polyethylene web, a nylon web and a polyethylene web.

In some instances, it is desirable to make the parts of an automotive air bag of double ply nylon material. When this is the case, roll 49 of material supply section 43 would be a roll of nylon material; roll 50 would also be a roll of nylon material; roll 51 would be a roll of polyethylene material; and roll 52 would not be used. As a result of this, the series of webs or plies reaching feed rolls 77 and 78 would, in sequence from top to bottom, constitute a nylon web, a nylon web, and a polyethylene web. In such an instance, when two adjacent nylon webs have a pan cut therefrom, the cut portions of the webs will be welded together at their peripheries, forming the desired two-ply part.

No matter which of the two options just described is used, the assembly of webs provided by the material supply section 43, during initial thread up, is caused to pass between feed rolls 77 and 78 and cross the top surface of table 73. The forwardmost edges of the webs will be caused to extend slightly beyond that edge of table 73 which faces the loading/unloading zone 15. The plies are clamped by actuation of clamping bar 100 against the top surface of the table. The non-uniform forwardmost edges of the plies are then cut by cutter 93 so that the plies present straight and uniform forwardmost edges. The scrap created by this cut is removed and the gripper bar 86 is caused to advance toward the table until the leading edges of the webs or plies are engaged by grippers 87. At this point, the initial thread up is complete and automatic operation may begin.

While either the upper carriage 16 or the lower carriage 17 may be located in the loading/unloading zone 15, for purposes of an exemplary explanation let it be assumed that upper carriage 16 is in the loading/unloading zone. The gripper bar 86 and its grippers 87 will shift to their extended position drawing the webs or plies across the pallet 20 of upper carriage 16. When the gripper bar 86 has reached the end of its forward travel, clamping bar 100 will clamp the plies or webs to the upper surface of table 73 and cutter 93 will sever the initial set of plies from the webs and this initial set of plies will simultaneously be released by the grippers 87. The initial set of plies will fall upon pallet 20 of upper carriage 16.

Thereafter, the gripper bar will shift to its rearward position wherein the grippers 87 will engage the freshly cut edges of the webs. Clamping bar 100 will thereafter be shifted to its unclamping position and the webs will again be drawn across upper carriage 16. When gripper bar 86 reaches its forwardmost position, clamping bar 100 will clamp the webs against the top of table 73 and once again the cutter 93 will sever the second set of plies from the webs which, when released by grippers 87, will fall on top of the first set of plies. This procedure is repeated until the desired number of plies has been attained. The number of plies will be determined by a series of factors including the nature of the material being cut, the thickness of the material being cut, and the like. The greater the number of plies, the more energy is required and the laser must be run slower. When utilizing the lower carriage 17 and its pallet 26, the number of plies cannot exceed the clearance between the lower carriage 17 and the upper carriage 16. Good results have been achieved with as many as 36 or more nylon plies, with polyethylene plies located therebetween.

When the second-to-last group of plies is drawn across upper carriage 16, a pause is programmed in the machine operation. This enables the operator to draw the cover material web from roll 103 (see FIG. 2A) beneath idler roll 104, beneath clamping bar 100 and slightly beyond the path of travel of cutter 93. Thereafter, the cutting and stacking machine returns to its sequence of operation. Clamping bar 100 clamps the webs and the cover web to the upper surface of table 73 and cutter 93 severs the second to last group of plies from the webs which, when released by grippers 87 fall upon those plies already located on pallet 20. At the same time, the narrow portion of the cover web severed by cutter 93 is removed as scrap. Now, the last group of webs, together with the cover web, with their forwardmost edges fleshly cut and aligned, are approached by and engaged by grippers 87. Clamping bar 100 is shifted to its releasing position and the last series of webs and the cover web are drawn across the pallet 20 of upper carriage 16. Once the gripper bar 86 has reached its forwardmost position, clamping bar 100 clamps the last series of webs and the cover web to the top of table 73, and the last series of plies are severed from the webs, together with the cover material ply, all of which fall upon the ply stack when released by grippers 87. The cover material may constitute any appropriate material such as 100 pound kraft paper.

At this stage, the stack 21 is complete and the pallet 20 of upper carriage 16 is loaded and is caused to shift into the cutting zone 14, and the laser cutting operation is begun. At the same time, the lower carriage, if not already there, is shifted to the loading/unloading zone 15 and its pallet frame 24 and pallet 26 are elevated to the vertical level which had been occupied by the pallet 20 of upper carriage 16. The webs and cover material web are still clamped against the upper surface of table 73 by clamping bar 100. At this point the clamping bar 100 is raised to enable the operator to remove the cover web from beneath the clamping bar and idler roll 104. This can be done by rewinding roll 103 so that the end of cover web depends downwardly therefrom, as shown in FIG. 2A. The remaining webs stay in place by virtue of feed rolls 77 and 78 which engage the webs. The clamping bar is returned to its clamping position and the grippers 87 are caused to approach table 73 and engage the webs from rolls 49–52. At this point, clamping bar 100 is shifted to its releasing position and those webs engaged by the grippers 87 are drawn across the pallet 26 of lower carriage 17. It will be understood that the stack 28 of webs and the top most web of cover material is formed on the pallet 26 of lower carriage 17 in exactly the same way described with respect to the stacking of the webs on pallet 20 of upper carriage 16. When the stack 28 has been completed and the laser cutting operation on stack 21 has also been completed, the pallet frame 24 and pallet 26 carrying the stack 28 are lowered into lower carriage frame 23. Upper carriage 16 is then shifted from cutting zone 14 to loading/unloading zone 15 where the cut parts are first unloaded, together with scrap, and thereafter a new stack 21 of material plies is formed on pallet 20 of upper carriage 16. In the meantime, lower carriage 17 has been shifted to the cutting zone 14 and the cutting operation has been initiated with respect to stack 28. It is not necessary during the cutting operation to raise the pallet frame 24 and pallet 26, as in the loading/unloading zone 15, because the laser cutting head assembly 13 will move downwardly to accommodate the difference in level.

The above described sequence of operations is repeated as often as is desired, or until the material rolls 49–52 must be replaced.

It will be understood by one skilled in the art that the shorter the distance the plies must fall when dropped on pallet 20 or 26, the less the plies will be affected by floating or fluttering, and the stack 21 or 28 will be better aligned and more uniform. The optimum fall distance will depend upon the characteristics of the material being stacked, including such characteristics as stretch, weight, thickness and the like. In the exemplary embodiment described, excellent results have been achieved when the maximum drop of the first set of plies is about 1 inch. The total stack has a thickness of about ½ inch, and the last set of plies falls about ½ inch.

It has been determined that when the stack 21 or 28 of plies is provided with the above-noted cover ply, vacuum and other such expedience are not required to keep the stack plies in place. It has been found preferable that the laser head 13 apply sufficient pressure to the cover ply to cause the stack of plies 21 or 28 to be compressed up to about 50% at the position of the laser cutting head assembly 13. This keeps the laser beam from spreading and deflecting between plies.

Reference is made to FIGS. 4 and 5 wherein the laser cutting head assembly 13 of the present invention is illustrated. The laser cutting head assembly 13 comprises a support plate 105, carrying a pair of linear bearings 106 and 107 adapted to engage a pair of horizontal rails 108 and 109, respectively. Rails 108 and 109 are mounted on gantry 9 (not shown in FIGS. 4 and 5; see FIGS. 1 and 2). In this way, the laser cutting head assembly may be shifted by drive means (not shown) transversely of cutting zone 14.

The housing 110 for the Y-beam bender or mirror (not shown) is affixed to support plate 105. The laser beam is directed downwardly through a bellows 110 and into the laser cutting head 111 containing an appropriate focusing lens 111a.

The support plate 105 is provided with a pair of vertically oriented parallel rails 112 and 113. The laser head 11 is fixedly mounted on a laser head mounting plate 114. The laser head mounting plate 114 is provided with linear bearings by which it is slidably mounted on rails 112 and 113. The laser head mounting plate linear bearings for rail 112 are shown at 115 and 116 in FIG. 5. The laser head mounting plate linear bearings for rail 113 are substantially identical.

A drive carriage is mounted on the same pair of rails 112 and 113 behind laser head mounting plate 114. The drive carriage 117 is provided with a linear bearing for each of rails 112 and 113, one of which is shown in FIG. 5 at 118.

The drive carriage 117 has a pair of forwardly extending arms 119 and 120. The arms 119 and 120, respectively, extend through slots 121 and 122 formed in the laser head mounting plate 114. The free ends of arms 119 and 120 threadedly support adjustment bolts 123 and 124. A support spring 125 is affixed at its upper end to the lower end of adjustment bolt 123, as at 126. The lower end of support spring 125 is affixed to a shouldered bolt 127 mounted in laser head mounting plate 114. Similarly, a support spring 128 has its upper end connected to the lower end of adjustment bolt 124, as at 129. The lower end of support spring 128 is affixed to a shouldered bolt 130 mounted on laser head mounting plate 114.

In FIGS. 4 and 5, the laser head 111 is shown positioned upon the stack 28 of lower carriage 17. When it is desired to lift laser cutting head 111 to a retracted position so that lower carriage 17 can be removed to the loading/unloading zone 15, while the upper carriage 16 is shifted to the cutting zone 14, the drive carriage 117 is shifted vertically by means of a standard screw mechanism (not shown). The arms 119 and 120 will contact the upper ends of the slots 121 and 122 of laser head mounting plate 114 causing it and the laser cutting head 111 to move upwardly. This lifting procedure is the same when the laser cutting head 111 is being raised from either of the stacks 21 and 28.

When the laser cutting head 111 is to be lowered onto stack 28 the drive carriage 117 is driven downwardly until the laser cutting head shoe assembly, generally indicated at 131 contacts the stack 28. A limit switch (not shown) is actuated the moment the arms 119 and 120 of drive carriage 117 lose contact with the upper edge of laser head mounting plate slots 121 and 122. This initiates a time sequence during which, for a predetermined number of milliseconds, the drive carriage 117 is permitted to continue its downward movement. When this very short time interval ends, the drive carriage 117 is stopped, as is shown in FIGS. 4 and 5. When the laser cutting head 111 is in its cutting position shown in FIGS. 4 and 5, the stack 28 will bear a sufficient amount of the weight of the laser cutting head to compress the stack from 0% to about 50%, as noted above. At the same time, the bulk of the weight of the laser cutting head 111 is supported by springs 125 and 128. It has been found that this arrangement, in conjunction with the laser cutting head shoe assembly 131, will enable the laser cutting head 111 to shift back and forth along the stack 28 without displacing the stack or any plies thereof. Since the mounting of the laser cutting head 111 is not rigid, laser cutting head 111 is capable of slight vertical shifting, should them be a slight inconsistency in stack 28. It will be understood that the laser cutting head 111 and its shoe assembly 131 will cooperate in an identical manner with stack 21 of upper carriage 16.

The shoe assembly 131 of the laser cutting head 111 comprises a central shoe 132 and an outer annular shoe extension 133. The shoe 132 comprises a dish-shaped member operatively attached to the lower end of laser cutting head 111. The shoe 132 is provided with a central aperture 111b through which the laser beam extends. Pressure to compress stack 28 at the point of laser beam impingement is applied by shoe 132.

The outer annular shoe extension 133 is an optional device which is affixed to shoe 132. The outer annular shoe extension 133 assures that, as the laser cutting head 111 is traversed along or across the stack 28, it will not catch and lift a previously cut portion of the stack. The laser shoe 132 has an adjustment ring 134. Turning of adjustment 134 will raise or lower shoe 132 with respect to laser cutting head 111. In this way, the distance between the focal point of the laser beam and the shoe can be adjusted.

Preferably the laser cutting head is connected as at 111c to a source of assist gas under pressure which exits the laser cutting head 111 through the shoe aperture, coaxially with the cutting beam. The pressurized assist gas blows any molten material, cutting debris, or the like downwardly out of the cut made by the laser beam.

It will be apparent from the above description that the method of the present invention and the combination of the CNC laser center 1 and the cutting and stacking machine 2 provide a highly efficient, automatic arrangement for the stacking and laser cutting of multiple layers of flexible material.

Modifications may be made in the invention without departing from the spirit of it.

What is claimed:

1. A stacking and laser cutting system for cutting multiple layers of flexible material, said system comprising a CNC laser center and a cutting and stacking machine, said laser center including a cutting zone, a loading and unloading zone, a laser cutting head assembly shiftable anywhere within said cutting zone, art upper carriage supporting a pallet and a lower carriage supporting a pallet, means for shifting said upper and lower carriages and their pallets between said cutting zone and said loading and unloading zone, said pallet of said upper carriage occupying a predetermined vertical level, means to raise said pallet of said lower carriage to the same predetermined vertical level when said lower carriage and its pallet are in said loading and unloading zone, said cutting and stacking machine comprising a material supply section and a cutting and stacking section, said material supply section providing at least one material web to said cutting and stacking section, said cutting and stacking section being mounted on said laser center over said loading and unloading zone thereof, a first one of said upper and lower carriages and their pallets being located in said loading and unloading zone and a second one of said upper and lower carriages and their pallets being located in said cutting zone, means in said cutting and stacking section for gripping said at least one web from said material supply section and pulling said at least one web over said pallet of said first one of said upper and lower carriages within said loading and unloading zone, means for cutting said at least one web to form at least one ply on said pallet in said loading and unloading zone, means to actuate said gripping and pulling means and said cutting means until a stack of a desired number of plies is deposited on said pallet in said loading and unloading zone, means to actuate said carriage and pallet shifting means to shift said first one of said upper and lower carriages and their pallets to said cutting zone for cutting patterns from said stack thereon, and to shift said second one of said upper and lower carriages and their pallets to said loading and unloading zone whereby a stack of material plies is formed thereon for subsequent shifting to said cutting zone.

2. The system claimed in claim 1 wherein said material supply section comprises a number of roll stands, a roll of said material to be cut being supported by every other one of said stands, a roll of interleaving material being supported by the remainder of said stands whereby each stack of plies formed in said loading and unloading zone comprises a stack of alternate plies of said material to be cut and said interleaving material.

3. The system claimed in claim 1 wherein said material supply section comprises a plurality of roll stands and a roll of material supported by each of said roll stands, said rolls comprising rolls of said material to be cut and at least one roll of interleaving material, said rolls being so arranged on said stands that each stack of plies formed in said loading and unloading zone comprises stacks of pairs of plies of said material to be cut, adjacent ones of said pairs of plies being separated from each other by a ply of said interleaving material.

4. The system claimed in claim 1 including a support located between said cutting and stacking section and said material supply section of said cutting and stacking machine, a roll of cover material rotatively mounted on said support, there being a last actuation of said gripping and pulling means and said cutting means to complete said stack on said pallet in said loading and unloading zone, a web of said cover material from said roll thereof being locatable on top of said at least one web from said supply section, and engagable along with said at least one web beneath it by said gripping and pulling means of said cutting and stacking section immediately prior to said last actuation thereof for said stack being formed, said web of said cover material being severable along with said at least one web beneath it to form an uppermost ply of said cover material on said stack being formed.

5. The system claimed in claim 2 wherein said material to be cut comprises nylon, and said interleaving material is chosen from the class consisting of polyethylene, wax coated paper, polyethylene coated paper and kraft paper.

6. The system claimed in claim 3 wherein said material to be cut comprises nylon, and said interleaving material is chosen from the class consisting of polyethylene, wax coated paper, polyethylene coated paper and kraft paper.

7. The system claimed in claim 4 wherein said cover material comprises kraft paper.

8. The system claimed in claim 4 wherein said stack being formed, when transferred to said cutting zone, has said cover material ply engaged by said laser cutting head assembly with sufficient downward force to compress said stack up to about 50% at the position of said laser cutting head assembly.

9. The system claimed in claim 5 including a support located between said cutting and stacking section and said material supply section of said cutting and stacking machine, a roll of cover material rotatively mounted on said support, there being a last actuation of said gripping and pulling means and said cutting means to complete said stack on said pallet in said loading and unloading zone, a web of said cover material from said roll thereof being locatable on top of said at least one web from said supply section, and engagable along with said at least one web beneath it by said gripping and pulling means of said cutting and stacking section immediately prior to said last actuation thereof for said stack being formed, said web of said cover material being severable along with said at least one web beneath it to form an uppermost ply of said cover material on said stack being formed.

10. The system claimed in claim 5 wherein said material supply section comprises first, second, third and fourth roll stands arranged in tandem behind said cutting and stacking section, said first and third stands supporting rolls of said nylon, said second and fourth stands supporting rolls of said interleaving material.

11. The system claimed in claim 6 including a support located between said cutting and stacking section and said material supply section of said cutting and stacking machine, a roll of cover material rotatively mounted on said support, there being a last actuation of said gripping and pulling means and said cutting means to complete said stack on said pallet in said loading and unloading zone, a web of said cover material from said roll thereof being locatable on top of said at least one web from said supply section, and engagable along with said at least one web beneath it by said gripping and pulling means of said cutting and stacking section immediately prior to said last actuation thereof for said stack being formed, said web of said cover material being severable along with said at least one web beneath it to form an uppermost ply of said cover material on said stack being formed.

12. The system claimed in claim 6 wherein said material supply section comprises first, second and third roll stands arranged in tandem behind said cutting and stacking section, said first and second roll stands supporting rolls of said nylon, and said third roll stand supporting a roll of said interleaving material, said patterns cut from said adjacent nylon plies of said stack being welded together along their peripheries whereby to form a two ply pattern piece.

13. The system claimed in claim 8 wherein said laser cutting head assembly has a downwardly directed laser cutting beam extending therefrom during a cutting operation to cut said stack of plies, and a coaxial jet of pressurized assist gas about said beam to blow away molten material and debris out of said cut.

14. The system claimed in claim 9 wherein said stack being formed, when transferred to said cutting zone has said cover material ply engaged by said laser cutting head assembly with sufficient downward force to compress said stack by up to about 50% at the position of said laser cutting head assembly.

15. The system claimed in claim 11 wherein said stack being formed, when transferred to said cutting zone has said cover material ply engaged by said laser cutting head assembly with sufficient downward force to compress said stack by up to about 50% at the position of said laser cutting head assembly.

16. The system claimed in claim 14 wherein said laser cutting head assembly has a downwardly directed laser cutting beam extending therefrom during a cutting operation to cut said stack of plies, and a coaxial jet of pressurized assist gas about said beam to blow away molten material and debris out of said cut.

17. The system claimed in claim 15 wherein said laser cutting head assembly has a downwardly directed laser cutting beam extending therefrom during a cutting operation to cut said stack of plies, and a coaxial jet of pressurized assist gas about said beam to blow away molten material and debris out of said cut.

18. A method of stacking and cutting multiple layers of flexible material comprising the steps of providing a CNC laser center including a cutting zone, a loading and unloading zone, a laser cutting head assembly shiftable anywhere within said cutting zone, and art upper carriage supporting a pallet and lower carriage supporting a pallet both shiftable between said cutting zone and said loading and unloading zone, providing a cutting and stacking machine including a material supply section and a cutting and stacking section, providing means in said material supply section for directing at least one web of material to said cutting and stacking section, providing means in said cutting and stacking section to advance said at least one web, providing means in said cutting and stacking section to grip said at least one web and draw said at least one web forwardly, and providing cutting means in said cutting and stacking section to sever said at least one web into at least one stackable ply, locating said cutting and stacking section of said cutting and stacking machine over said loading and unloading zone of said CNC laser center, shifting a first one of said upper and lower carriages and its pallet into said loading and unloading zone, shifting a second one of said upper and lower carriages and its pallet to said cutting zone, feeding said at least one web from said material supply section into said cutting and stacking section, gripping and drawing said at least one web over said first one of said upper and lower carriages and its pallet, cutting said at least one web to form at least one stackable ply, depositing said at least one ply onto said pallet over which it was drawn, repeating said feeding step, said gripping and drawing step, said cutting step and said depositing step until a stack of a desired number of plies is achieved, shifting said first one of said upper and lower carriages and its pallet to said cutting zone for laser cutting patterns from said stack, shifting said second one of said upper and lower carriages and its pallet to said loading and unloading zone to form a stack thereon for subsequent cutting in said cutting zone.

19. The method claimed in claim 18 wherein said upper and lower carriage and pallet assemblies are supported by and shift along upper and lower sets of horizontal rails predetermining the vertical level of said pallets, and including the step of raising said pallet of said lower carriage to said predetermined vertical level of said pallet of said upper carriage when said lower carriage and its pallet is in said loading and unloading zone.

20. The method claimed in claim 18 including the steps of providing a plurality of roll stands in said material supply section, supplying a plurality of rolls of material to be cut and interleaving material, directing a ply from each roll to said cutting and stacking section, and arranging the order of said rolls to provide said stack in which a ply of interleaving material is located between each ply of material to be cut.

21. The method claimed in claim 18 including the steps of providing a plurality of roll stands in said material supply section, supplying a plurality of rolls of material to be cut and interleaving material, directing a ply from each roll to said cutting and stacking section, and arranging the order of said rolls to provide said stack in which a ply of said interleaving material is located between adjacent pairs of plies of said material to be cut.

22. The method claimed in claim 18 including the steps of providing a roll of cover material, supporting said roll of cover material between said cutting and stacking section and said material supply section, introducing a web of said cover material from said roll thereof into said cutting and stacking section after the second to last actuation of said gripping means for said stack being formed, trimming the leading edge of cover material web during the second to last actuation of said cutting means for said stack being formed, gripping said cover material web together with said at least one web from said material supply section, drawing said webs across said pallet being loaded and cutting said webs into plies during the last actuation of said gripping and drawing means and said cutting means for said stack being formed, depositing said plies on said pallet being loaded, with said cover material ply on top of said stack being formed.

23. The method claimed in claim 20 including the steps of selecting nylon as said material to be cut, and choosing said interleaving material from the class consisting of polyethylene, wax coated paper, polyethylene coated paper and kraft paper.

24. The reel;hod claimed in claim 21 including the steps of selecting nylon as said material to be cut, and choosing said interleaving material from the class consisting of polyethylene, wax coated paper, polyethylene coated paper and kraft paper.

25. The method claimed in claim 22 including the step of providing a kraft paper as said cover material.

26. The method claimed in claim 22, including the steps of transferring said stack to said cutting zone and engaging said cover material ply by said laser cutting head assembly with sufficient downward force to compress said stack by up to about 50% at the position of said laser cutting head assembly.

27. The method claimed in claim 26 including the steps of directing a laser cutting beam downwardly from said laser cutting head assembly to cut said stack of plies during a cutting operation, and providing a coaxial jet of pressurized assist gas about said beam to blow away molten material and debris from said cut.

* * * * *

UNITED STATES PATENT AND TRADEMARK OFFICE
CERTIFICATE OF CORRECTION

PATENT NO. : 5,481,083
DATED : January 2, 1996
INVENTOR(S) : Dale C. Smyth, Jr.

It is certified that error appears in the above-indentified patent and that said Letters Patent is hereby corrected as shown below:

Column 13, line 15 (claim 1), "art" should read --an--.

Column 15, line 46 (claim 18) "art" should read --an--.

Column 16, line 64 (claim 24), "reel;hod" should read --method--.

Column 16, line 21 (claim 19), "is" should read --are--.

Signed and Sealed this

Sixth Day of August, 1996

Attest:

BRUCE LEHMAN

*Attesting Officer*  *Commissioner of Patents and Trademarks*